US011431895B2

(12) United States Patent
Zacharias et al.

(10) Patent No.: US 11,431,895 B2
(45) Date of Patent: Aug. 30, 2022

(54) PHOTOGRAPHY GUIDANCE BASED ON CROWDSOURCED PHOTOGRAPHS

(71) Applicant: International Business Machines Corporation, Armonk, NY (US)

(72) Inventors: Shinoj Zacharias, Bangalore (IN); Vijay Ekambaram, Bangalore (IN); Smitkumar Narotambhai Marvaniya, Bangalore (IN); Padmanabha Venkatagiri Seshadri, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 216 days.

(21) Appl. No.: 16/911,006

(22) Filed: Jun. 24, 2020

(65) Prior Publication Data

US 2021/0409593 A1    Dec. 30, 2021

(51) Int. Cl.
| | |
|---|---|
| *H04N 5/232* | (2006.01) |
| *G06N 20/00* | (2019.01) |
| *G06V 10/82* | (2022.01) |
| *G06V 10/762* | (2022.01) |
| *G06V 20/00* | (2022.01) |

(52) U.S. Cl.
CPC ..... *H04N 5/23222* (2013.01); *H04N 5/23216* (2013.01); *H04N 5/23225* (2013.01); *G06N 20/00* (2019.01); *G06V 10/762* (2022.01); *G06V 10/82* (2022.01); *G06V 20/35* (2022.01)

(58) Field of Classification Search
CPC .......... H04N 5/23222; H04N 5/23225; H04N 5/23216; G06N 20/00; G06V 10/762; G06V 10/82; G06V 20/35
See application file for complete search history.

(56) References Cited

U.S. PATENT DOCUMENTS

| | | |
|---|---|---|
| 8,861,881 B2 | 10/2014 | Tate et al. |
| 8,971,612 B2 | 3/2015 | Shotton et al. |
| 9,456,123 B2 | 9/2016 | Emmett et al. |
| 10,127,659 B2 | 11/2018 | Hsieh et al. |

(Continued)

FOREIGN PATENT DOCUMENTS

| | | |
|---|---|---|
| CN | 102591868 A | 7/2012 |
| WO | 2015189629 A2 | 12/2015 |

*Primary Examiner* — Daniel M Pasiewicz
(74) *Attorney, Agent, or Firm* — Troutman Pepper Hamilton Sanders LLP (57) ABSTRACT

Embodiments provide a computer-implemented method of recommending camera configuration parameters for taking one or more photographs, the method including: acquiring first spatial dimension data, first temporal dimension data, and first manufacturer dimension data of a particular camera for taking the one or more photographs; inputting the first spatial dimension data, the first temporal dimension data, and the first manufacturer dimension data to a trained machine learning model; recommending, by the trained machine learning model, one or more vantage points for taking the one or more photographs, each vantage point corresponding to a different set of predicted camera configuration parameters; receiving a selection of one of the one or more vantage points from the user; and providing a set of predicted camera configuration parameters corresponding to the selected vantage point.

17 Claims, 7 Drawing Sheets

(56) References Cited

U.S. PATENT DOCUMENTS

| | | | |
|---|---|---|---|
| 10,270,962 B1 | 4/2019 | Stout | |
| 2014/0354768 A1 | 12/2014 | Mei et al. | |
| 2016/0050360 A1 | 2/2016 | Fisher et al. | |
| 2016/0112630 A1 | 4/2016 | Kanumuri et al. | |
| 2016/0142626 A1* | 5/2016 | Bostick | G06Q 50/01 348/207.11 |
| 2018/0336415 A1 | 11/2018 | Anorga et al. | |
| 2019/0174056 A1* | 6/2019 | Jung | H04N 5/23218 |
| 2020/0053288 A1* | 2/2020 | Kim | H04N 5/23222 |
| 2021/0067701 A1* | 3/2021 | Tagra | H04N 5/232933 |

* cited by examiner

FIG. 7

PHOTOGRAPHY GUIDANCE BASED ON CROWDSOURCED PHOTOGRAPHS

TECHNICAL FIELD

The present application generally relates to guidance for improvement in photography, and in particular, to recommending one or more vantage points and camera configuration parameters for taking photographs.

BACKGROUND

When a user visits a tourist place, he/she takes photographs of it. Depending upon the skills of the user, the quality of the photographs varies. By contrast, several thousand photographs of famous tourist places are available online. These photographs are of high quality because they are taken by professional photographers. These high-quality photographs can be crowdsourced, so that the user can learn from the crowdsourced photographs.

However, every crowdsourced photograph is taken at a specific location (spatial dimension) at a specific time point (temporal dimension), using a specific camera (manufacturer dimension), while the user is taking a photograph in different spatial, manufacturer, and temporal dimensions. It is very rare to find an exact match between three dimensions of the user and three dimensions of crowdsourced photographs. Thus, it is unfeasible for the user to directly use the camera configuration parameters of any crowdsourced photograph for the current photography.

Accordingly, it is desired to recommend the user on how to determine one or more positions (i.e., vantage points) and camera configuration parameters for taking photographs based on high-quality crowdsourced photographs available online.

SUMMARY

Embodiments provide a computer-implemented method of recommending camera configuration parameters for taking one or more photographs by a user in a data processing system comprising a processor and a memory comprising instructions which are executed by the processor. The method includes: acquiring, by the processor, first spatial dimension data, first temporal dimension data, and first manufacturer dimension data of a particular camera for taking the one or more photographs; inputting, by the processor, the first spatial dimension data, the first temporal dimension data, and the first manufacturer dimension data to a trained machine learning model; recommending, by the trained machine learning model, one or more vantage points for taking the one or more photographs, each vantage point corresponding to a different set of predicted camera configuration parameters; receiving, by the processor, a selection of one of the one or more vantage points from the user; and providing, by the processor, a set of predicted camera configuration parameters corresponding to the selected vantage point.

Embodiments further provide a computer-implemented method of recommending camera configuration parameters for taking one or more photographs by a user, further comprising: instructing, by the processor, the user to reach the selected vantage point; and instructing, by the processor, the user to take the one or more photographs at the selected vantage point using the set of predicted camera configuration parameters.

Embodiments further provide a computer-implemented method of recommending camera configuration parameters for taking one or more photographs by a user, wherein the user is instructed to reach the selected vantage point under Augmented Reality guidance.

Embodiments further provide a computer-implemented method of recommending camera configuration parameters for taking one or more photographs by a user, further comprising: receiving, by the processor, a test photograph from the user, wherein the test photograph is taken by the particular camera; extracting, by the processor, the first spatial dimension data, the first temporal dimension data, and the first manufacturer dimension data from metadata of the test photograph; and inputting, by the processor, the test photograph to the trained machine learning model.

Embodiments further provide a computer-implemented method of recommending camera configuration parameters for taking one or more photographs by a user, further comprising: extracting, by the processor, first user constraint dimension data from the metadata of the test photograph; and inputting, by the processor, the first user constraint dimension data to the trained machine learning model.

Embodiments further provide a computer-implemented method of recommending camera configuration parameters for taking one or more photographs by a user, further comprising: converting, by the processor, the first spatial dimension data to a spatial embedding matrix; converting, by the processor, the first temporal dimension data to a temporal embedding matrix; converting, by the processor, the first manufacturer dimension data to a manufacturer embedding matrix; and building, by the processor, a joint embedding matrix based on the spatial embedding matrix, the temporal embedding matrix, and the manufacturer embedding matrix. The one or more vantage points are recommended, by the processor, based on the joint embedding matrix.

Embodiments further provide a computer-implemented method of recommending camera configuration parameters for taking one or more photographs by a user, further comprising: when the selected vantage point is unavailable, instructing, by the processor, the user to reselect an alternative location point within a first predetermined distance from the selected vantage point; instructing, by the processor, the user to reach the alternative location point; and instructing, by the processor, the user to take the one or more photographs at the alternative location point using the set of predicted camera configuration parameters corresponding to the selected vantage point.

Embodiments further provide a computer-implemented method of recommending camera configuration parameters for taking one or more photographs by a user, further comprising: obtaining one or more photography skills of neighboring people within a second predetermined distance from the user, wherein the one or more photographs are taken using the one or more photography skills of the neighboring people.

Embodiments further provide a computer-implemented method of recommending camera configuration parameters for taking one or more photographs by a user, further comprising: the trained machine learning model is trained by a method comprising: crowdsourcing, by the processor, a plurality of photographs from an internet; extracting, by the processor, second spatial dimension data, second temporal dimension data, second manufacturer dimension data, and a second set of camera configuration parameters from metadata of each crowdsourced photograph; inputting, by the processor, the second spatial dimension data, the second temporal dimension data, the second manufacturer dimension data, and the plurality of photographs to a machine learning model to be trained; and training, by the processor, the machine learning model to predict a different set of camera configuration parameters for each crowdsourced photograph, so that Mean Squared Error (MSE) loss between the predicted set of camera configuration parameters and the second set of camera configuration parameters is minimized.

Embodiments further provide a computer-implemented method of recommending camera configuration parameters for taking one or more photographs by a user, wherein the first spatial dimension data includes location coordinates of the particular camera, an angle of view of the particular camera, and a camera orientation of the particular camera; the first temporal dimension data includes weather condition, time information, and lighting condition; the first manufacturer dimension data includes focal length, resolution, filter type, lens details, depth camera, and autofocus.

In another illustrative embodiment, a computer program product comprising a computer-usable or readable medium having a computer-readable program is provided. The computer-readable program, when executed on a processor, causes the processor to perform various ones of, and combinations of, the operations outlined above with regard to the method illustrative embodiment.

In yet another illustrative embodiment, a system is provided. The system may comprise a processor configured to perform various ones of, and combinations of, the operations outlined above with regard to the method illustrative embodiment.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present disclosure are best understood from the following detailed description when read in connection with the accompanying drawings. For the purpose of illustrating the disclosure, there is shown in the drawings embodiments that are presently preferred, it being understood, however, that the disclosure is not limited to the specific embodiments disclosed.

DETAILED DESCRIPTION OF ILLUSTRATIVE EMBODIMENTS

The present disclosure may provide a system, a method, and/or a computer program product for recommending camera configuration parameters. The computer program product may include a computer-readable storage medium (or media) having computer-readable program instructions thereon for causing a processor to carry out aspects of the present invention.

In an embodiment, a user can learn from photography experts, so that the user can take a better photograph similar to that of photography experts. The camera configuration recommendation system can crowdsource a large number of photographs online, e.g., from Twitter®, Instagram®, Facebook®, and a plurality of travel websites, etc. These photographs were generally taken by photography experts, and thus have a high quality. All the detailed information of each crowdsourced photograph can be obtained from the meta-data of each crowdsourced photograph.

Every crowdsourced photograph has information covering a plurality of dimensions (i.e., spatial dimension, temporal dimension, manufacturer dimension, and user constraint dimension) that is saved in its meta-data. The spatial dimension data includes location coordinates of the camera where the photograph is taken, angle of view, camera orientation, etc. The temporal dimension includes the time of day, weather condition, light availability, light reflection, and other light-related parameters extracted from each crowdsourced photograph via image analysis or from metadata of each crowdsourced photograph. The manufacturer dimension includes hardware information of a camera embedded in a mobile phone, such as pixels, autofocus, etc. The user constraint dimension is optional and includes parameters set by a user, e.g., mode (selfie mode, portrait mode, sport mode, night mode, etc.), flash setting, filter setting, etc. In addition, the metadata further includes a set of camera configuration parameters actually used and saved during the photograph-click. The set of camera configuration parameters include, but not limited to, lens aperture, focal length, angle of view (AOV), distance from the camera to an object to be captured, using flash or not, etc.

Each of the dimensions is converted into an embedding matrix. In an embedding matrix, similar dimension configurations lie as nearby points. For example, in the spatial embedding matrix, similar location coordinates lie as nearby points. The Skip-gram or Continuous Bag of Words (CBOW) technique is used for building each embedding matrix.

The plurality of embedding matrices (i.e., a spatial embedding matrix, a temporal embedding matrix, a manufacturer embedding matrix, and an optional user constraint embedding matrix) work as ground truth data to train a machine learning model that predicts a value for each camera configuration parameter. In other words, the training data inputted to the machine learning model is embedding representations of spatial dimension, temporal dimension, manufacturer dimension, and optional user constraint dimension, while the output of the machine learning model is predicted camera configuration parameters for taking each crowdsourced photograph.

In an embodiment, Mean Squared Error (MSE) loss is calculated by taking the mean of squared differences between actual camera configuration parameters and predicted camera configuration parameters. The machine learning model is trained to minimize the MSE loss, so that the predicted camera configuration parameters can be almost the same as the actual camera configuration parameters. In an embodiment, the machine learning model can be a deep neural network composed of various fully connected (FC) layers. In the machine learning model, a joint embedding matrix can be built based on the plurality of embedding matrices. In the joint embedding matrix, similar dimension configurations with respect to the plurality of dimensions lie as nearby points.

After the machine learning model is trained, a user can utilize this trained machine learning model to obtain a recommended set of camera configuration parameters, so that the user can take a photograph having a high-quality similar to that of photography experts. In an embodiment, a camera configuration recommendation system can obtain the user's spatial dimension, the user's temporal dimension, the user's manufacturer dimension, and an optional user's constraint dimension from the user. The dimension data can be manually inputted by the user, or extracted from a test photograph taken by the user. For example, the user can take a test photograph, and all the four dimensions information can be extracted from metadata of this test photograph, and/or extracted from the test photograph itself via image analysis.

All the user's dimension data is inputted to the trained machine learning model to predict the user's camera configuration parameters. The machine learning model can predict the best possible camera configuration parameters for the user camera, which minimizes MSE loss across spatial, temporal, manufacturer, and user constraint dimensions. In an embodiment, the predicted camera configuration parameters can be existing camera configuration parameters used for training. In another embodiment, the predicted camera configuration parameters can be new configuration parameters not seen during the training, and the new configuration parameters are generated by merging/fusing the plurality of dimensions to reduce the MSE loss.

In an embodiment, the camera configuration recommendation system can provide Augmented Reality (AR) guidance for the user to reach one or more best vantage points for taking a photograph. For example, direction arrows can be shown on a screen of the mobile phone to guide the user to reach any of the recommended vantage points. A recommended set of camera configuration parameters is provided for each vantage point.

Figure 1:
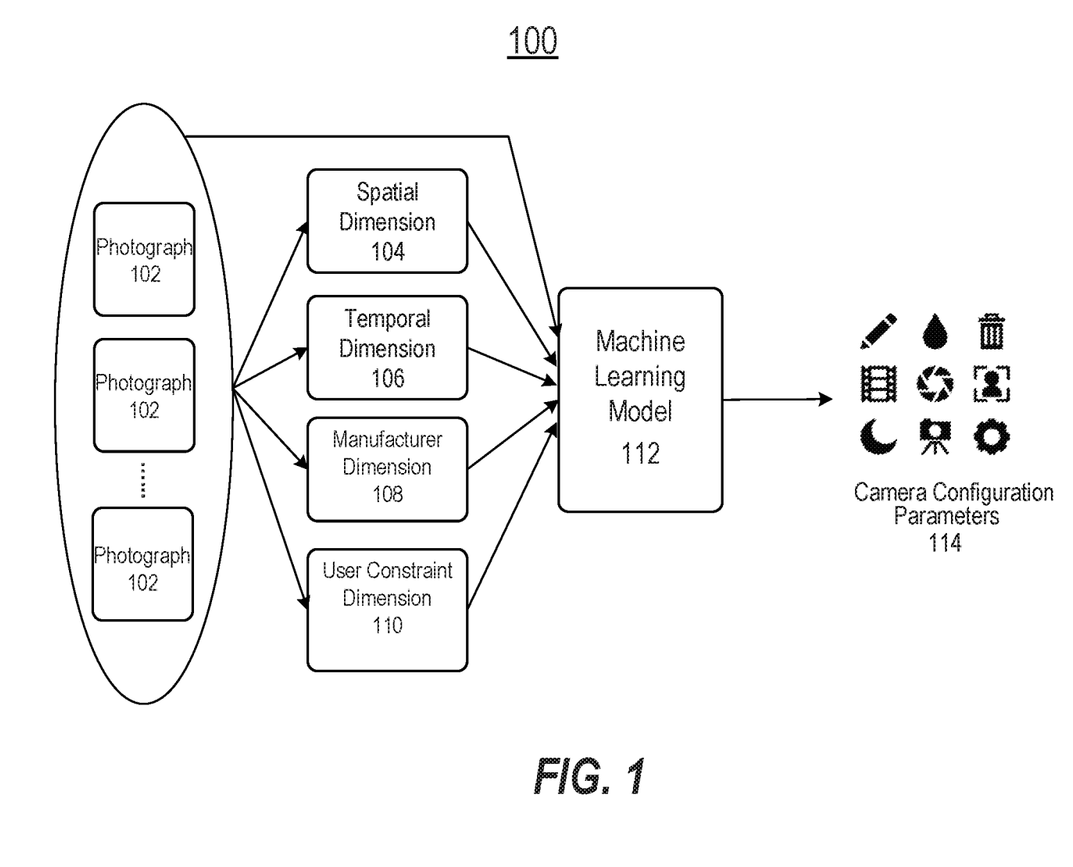
FIG. 1 is a block diagram of a framework architecture 100 for training a machine learning model 112 for predicting camera configuration parameters, according to embodiments described herein.

FIG. 1 is a block diagram of a framework architecture 100 for training a machine learning model 112 for predicting camera configuration parameters, according to embodiments described herein. As shown in FIG. 1, a large number of crowdsourced photographs 102 are used as ground truth data for training the machine learning model 112. In an embodiment, spatial dimension data 104, temporal dimension data 106, manufacturer dimension data 108 of each crowdsourced photograph 102 are extracted from the metadata of each crowdsourced photograph 102.

The spatial dimension data 104 includes location coordinates of a camera or a mobile phone having a camera, angle of view, and camera orientation, etc. The spatial dimension data 104 can further include attributes obtained by analyzing the visual semantic of each crowdsourced photograph 102. For example, the spatial dimension data 104 can further include a position of an object to be captured relative to a subject (e.g., a person or a group of people) by analyzing the visual content of each crowdsourced photograph 102. For example, a group of people (a subject) stands on the right of the Eiffel tower (an object). The spatial dimension data 104 can further include a camera direction with respect to the center of the object. All the spatial dimension data 104 is inputted to the machine learning model 112 (e.g., a deep neural network) and converted into a spatial embedding matrix for training the machine learning model 112.

The temporal dimension data 106 includes a set of attributes present in each crowdsourced photograph 102 with respect to time. For example, the temporal dimension data 106 can include weather condition, time information, and lighting condition. In an example, the temporal dimension data 106 can be <Eiffel Tower, Cloudy Weather, After sunset, No Sun, No Rain, Evening Time>. In another example, the temporal dimension data 106 can be <Eiffel Tower, Sunny Weather, Clear Sky, Light Cloud, Sunlight, No Rain, Noon Time>. All the temporal dimension data 106 is inputted to the machine learning model 112 (e.g., a deep neural network) and converted into a temporal embedding matrix for training the machine learning model 112.

The manufacturer dimension data 108 includes camera hardware details, e.g., focal length; resolution; filter type; lens details (Ultra-Wide/Wide Angle/Telephotograph); depth camera function enabled or disabled; autofocus function provided or not. The camera hardware details can be obtained from a brand/model of a mobile phone having the camera, e.g., Galaxy S10+, Galaxy S10, Galaxy S10e, etc. All the manufacturer dimension data 108 is inputted to the machine learning model 112 (e.g., a deep neural network) and is converted into a manufacturer embedding matrix for training the machine learning model 112.

In another embodiment, additional user constraint dimension data 110 of each crowdsourced photograph 102 is also extracted from the metadata of each crowdsourced photograph 102, and inputted to the machine learning model 112. The user constraint dimension data 110 is then converted into a user constraint embedding matrix for training the machine learning model 112.

In the machine learning model 112, a joint embedding matrix can be built based on the spatial embedding matrix, the temporal embedding matrix, the manufacturer embedding matrix, and the optional user constraint embedding matrix. In the joint embedding matrix, similar dimension configurations with respect to the plurality of dimensions lie as nearby points.

The machine learning model 112 is trained to minimize MSE loss between actual camera configuration parameters (obtained from the metadata of each crowdsourced photograph 102) and predicted camera configuration parameters 114, so that the predicted camera configuration parameters 114 can be almost the same as the actual camera configuration parameters.

In accordance with some exemplary embodiments, the framework architecture 100 includes a logic implemented in specialized hardware, software executed on hardware, or any combination of specialized hardware and software executed on hardware.

Figure 2:
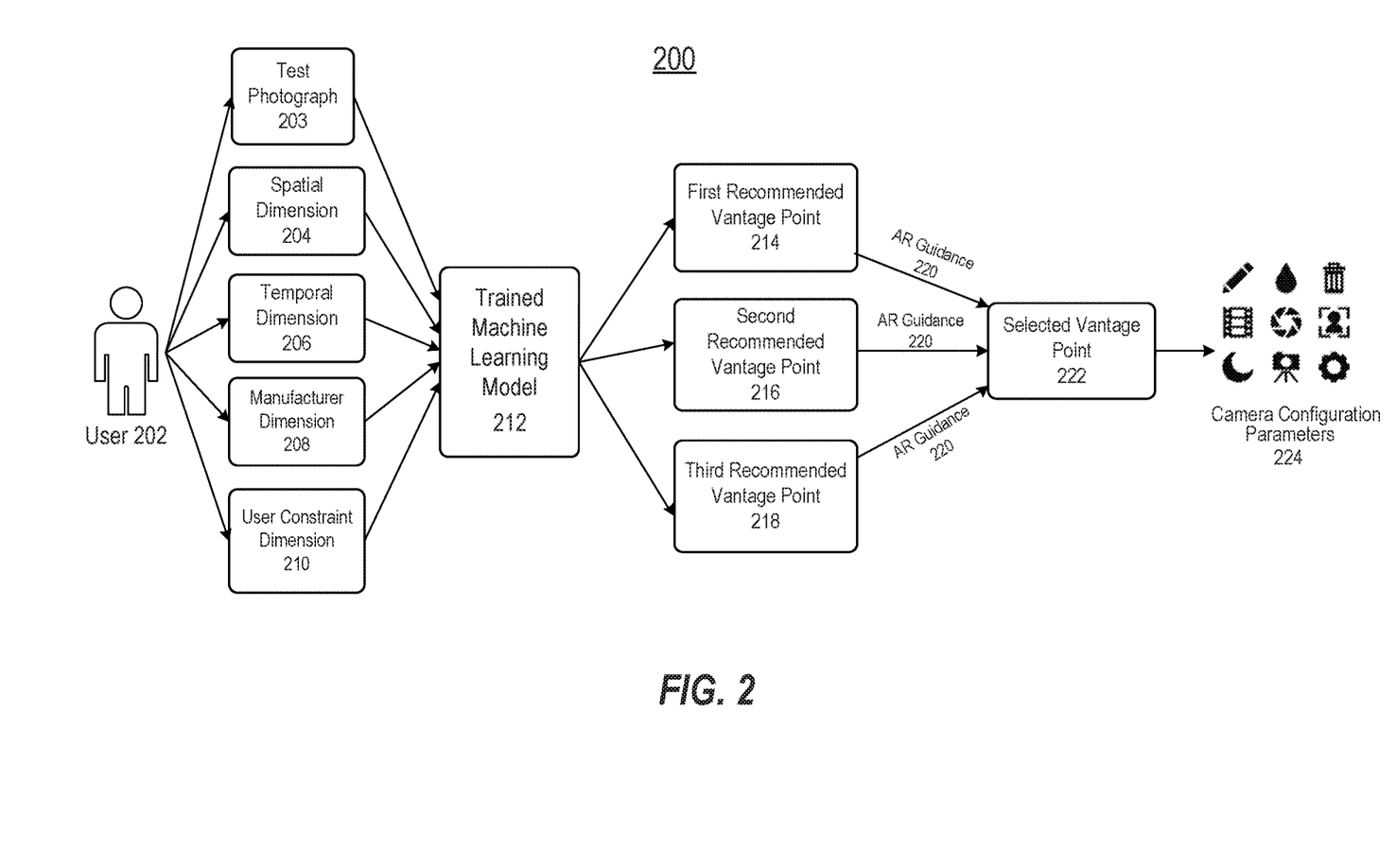
FIG. 2 is a block diagram of a framework architecture 200 for applying a trained machine learning model 212 for recommending one or more vantage points and corresponding camera configuration parameters, according to embodiments described herein.

FIG. 2 is a block diagram of a framework architecture 200 for applying a trained machine learning model 212 for recommending one or more vantage points and corresponding camera configuration parameters, according to embodiments described herein. As shown in FIG. 2, in an embodiment, a user 202 is in a tourist place and will take some photographs. In an embodiment, the spatial dimension data 204, temporal dimension data 206, manufacturer dimension data 208, user constraint dimension data 210 related to the user 202 can be manually inputted by the user 202. In another embodiment, the user can take a test photograph 203, and all four-dimension data can be obtained from metadata of the test photograph 203. All four-dimension data and the test photograph 203 are input into a trained machine learning model 212. The trained machine learning model 212 was trained in the framework architecture 100 as shown in FIG. 1. In an embodiment, the trained machine learning model 212 is a conventional deep neural network. The trained machine learning model 212 can calculate location coordinates of an object to be captured (e.g., Eiffel tower). Based on the location coordinates of the object, the trained machine learning model 212 can further recommend one or more vantage points (e.g., the first recommended vantage point 214, the second recommended vantage point 216, the third recommended vantage point 218, etc.) for taking photographs of the object. Each vantage point corresponds to a different set of predicted camera configuration parameters 224. The user 202 can select a vantage point 222 among the one or more recommended vantage points. For example, the user 202 can select the vantage point 222 that is closest to his/her current position. In an embodiment, the user 202 can reach the selected vantage point 222 with AR guidance 220. In an example, virtual assistance can be provided to the user 202, so that the user 202 can reach the selected vantage point 222 easily. For example, arrows indicating directions can be shown on a screen of the mobile phone to guide the user 202. For another example, voice prompts can be provided to the user 202 for navigation. In another embodiment, the user 202 can reach the selected vantage point 222 through a Global Positioning System (GPS) navigation application, such as Google map, Waze, etc.

In accordance with some exemplary embodiments, the framework architecture 200 includes a logic implemented in specialized hardware, software executed on hardware, or any combination of specialized hardware and software executed on hardware.

Figure 3:
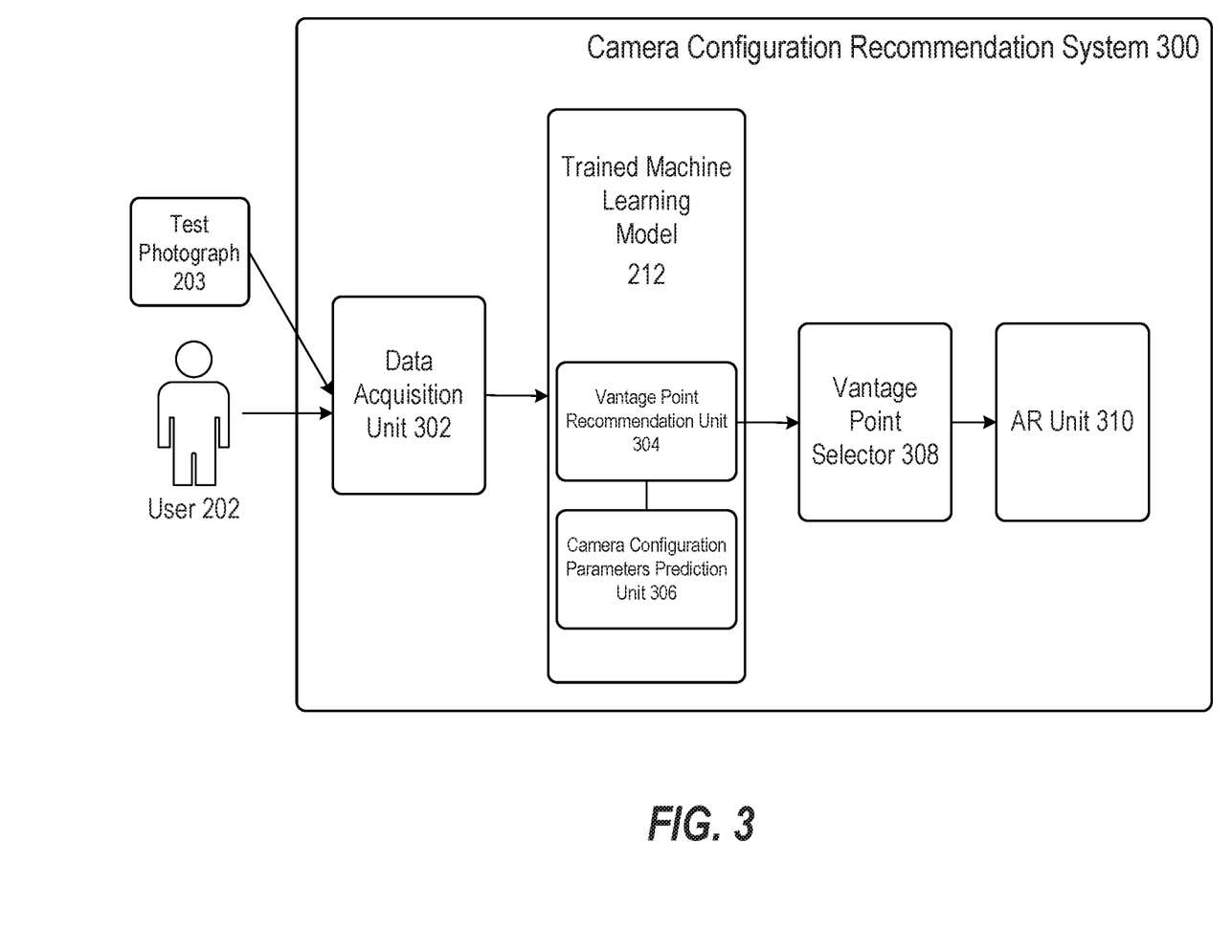
FIG. 3 is a block diagram of a camera configuration recommendation system 300, according to embodiments described herein.

FIG. 3 is a block diagram of a camera configuration recommendation system 300, according to embodiments described herein. As shown in FIG. 3, in an embodiment, the camera configuration recommendation system 300 includes a data acquisition unit 302, the trained machine learning model 212, a vantage point selector 308, and an AR unit 310. The data acquisition unit 302 is configured to acquire three-dimension or four-dimension data from the user 202 or the test photograph 203. The trained machine learning model 212 is configured to recommend one or more vantage points for photograph-click and a different set of camera configuration parameters for each vantage point. The trained machine learning model 212 further includes a vantage point recommendation unit 304 and camera configuration parameters prediction unit 306. The vantage point recommendation unit 304 is configured to recommend one or more vantage points for photograph-click based on the joint embedding matrix. The camera configuration parameters prediction unit 306 is configured to predict a different set of camera configuration parameters for each vantage point. The vantage point selector 308 is configured to receive a selection from the user 202. The user 202 can select any recommended vantage point and its corresponding set of camera configuration parameters. The AR unit 310 is configured to guide the user 202 to reach the selected vantage point through Augmented Reality techniques. The camera configuration recommendation system 300 can be implemented on a handheld device, such as a mobile phone, a tablet, etc., or on a computer.

Figure 4:
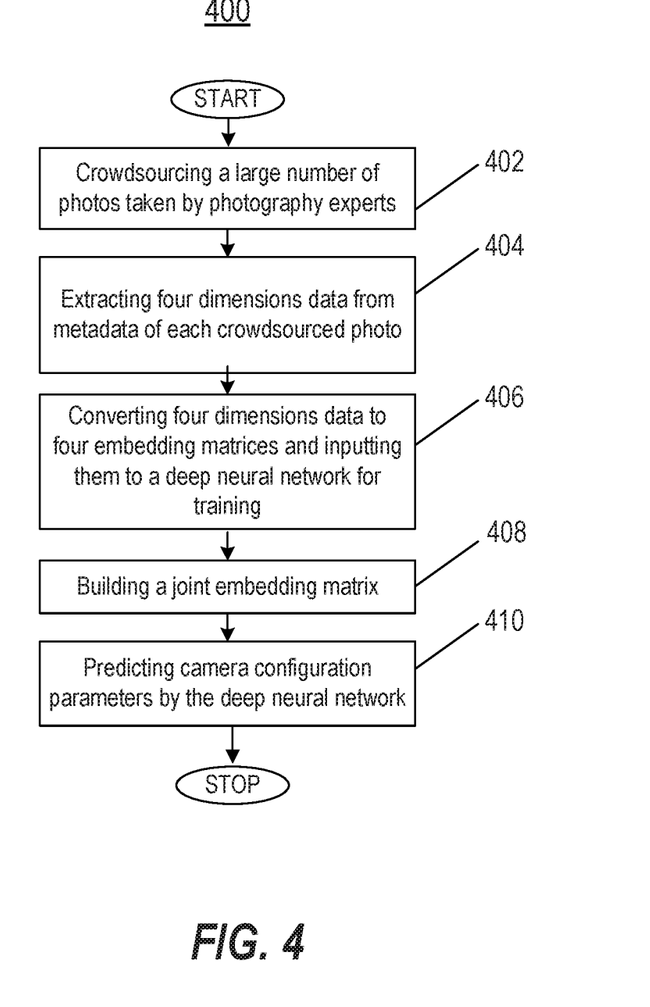
FIG. 4 depicts a flowchart of an exemplary method 400 for training a machine learning model for predicting camera configuration parameters, according to embodiments described herein.

FIG. 4 depicts an exemplary flowchart 400 for training a machine learning model for predicting camera configuration parameters, according to embodiments described herein. At step 402, a large number of photographs taken by photography experts are crowdsourced from the Internet, e.g., through a web crawler application.

At step 404, spatial dimension data, temporal dimension data, manufacturer dimension data, and user constraint dimension data are extracted from the metadata of each crowdsourced photograph.

At step 406, the spatial dimension data is converted into a spatial embedding matrix; the temporal dimension data is converted into a temporal embedding matrix; the manufacturer dimension data is converted into a manufacturer embedding matrix; the user constraint dimension data is converted into a user constraint embedding matrix. These matrices, as well as the crowdsourced photographs, are used to train a deep neural network including four fully connected (FC) layers corresponding to the four dimensions, respectively.

At step 408, in the deep neural network, a joint embedding matrix is built based on the four embedding matrices. The joint embedding matrix merges or fuses the four embedding matrices, to minimize MSE loss between actual camera configuration parameters (obtained from the metadata) and predicted camera configuration parameters across spatial, temporal, manufacturer, and user constraint dimensions.

At step 410, camera configuration parameters are predicted by the deep neural network and outputted from the deep neural network.

Figure 5:
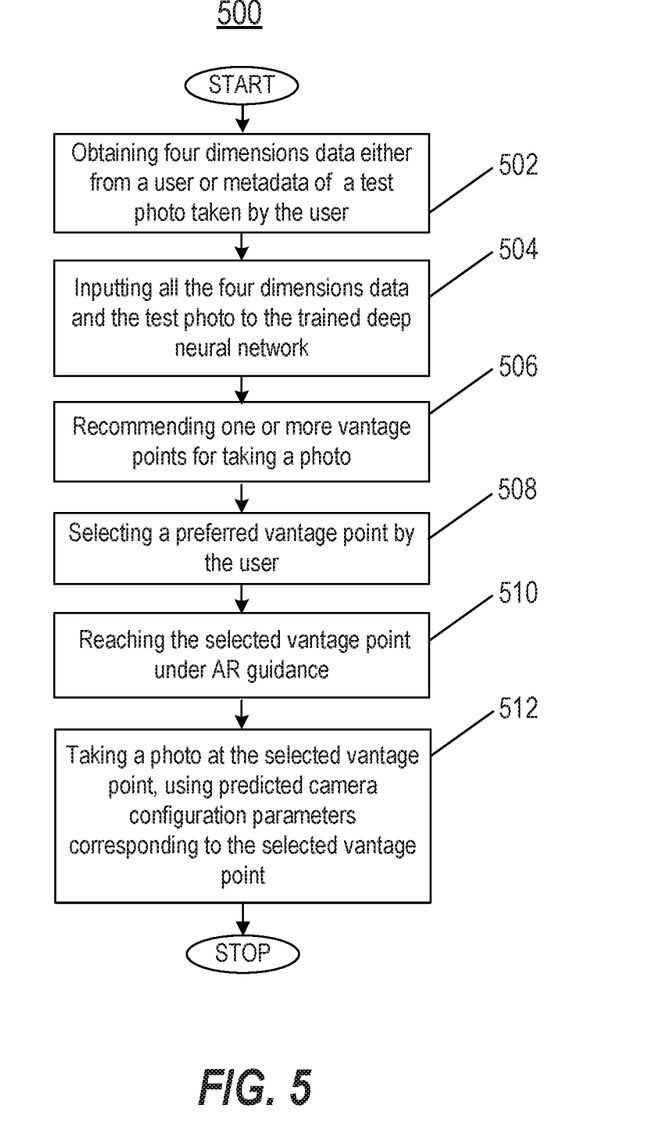
FIG. 5 depicts a flowchart of an exemplary method 500 for applying a trained machine learning model for recommending one or more vantage points and corresponding camera configuration parameters, according to embodiments described herein.

FIG. 5 depicts an exemplary flowchart 500 for applying a trained machine learning model for recommending one or more vantage points and corresponding camera configuration parameters, according to embodiments described herein. At step 502, spatial dimension data, temporal dimension data, manufacturer dimension data, and user constraint dimension data are either manually input by a user or extracted from the metadata of a test photograph taken by the user.

At step 504, all four-dimension data and the test photograph are inputted to a trained deep neural network, which was trained in the method of FIG. 4.

At step 506, the trained deep neural network recommends one or more vantage points for taking a photograph, each vantage point corresponding to a different set of predicted camera configuration parameters.

At step 508, the user selects his/her preferred vantage point. For example, the user can select the nearest vantage point, or a vantage point having fewest tourists nearby.

At step 510, the user reaches the selected vantage point under Augmented Reality (AR) guidance. The virtual assistance provided through Augmented Reality can guide the user to reach the selected vantage point easily.

At step 512, the user takes a photograph at the selected vantage point, using a set of predicted camera configuration parameters corresponding to the selected vantage point.

Figure 6:
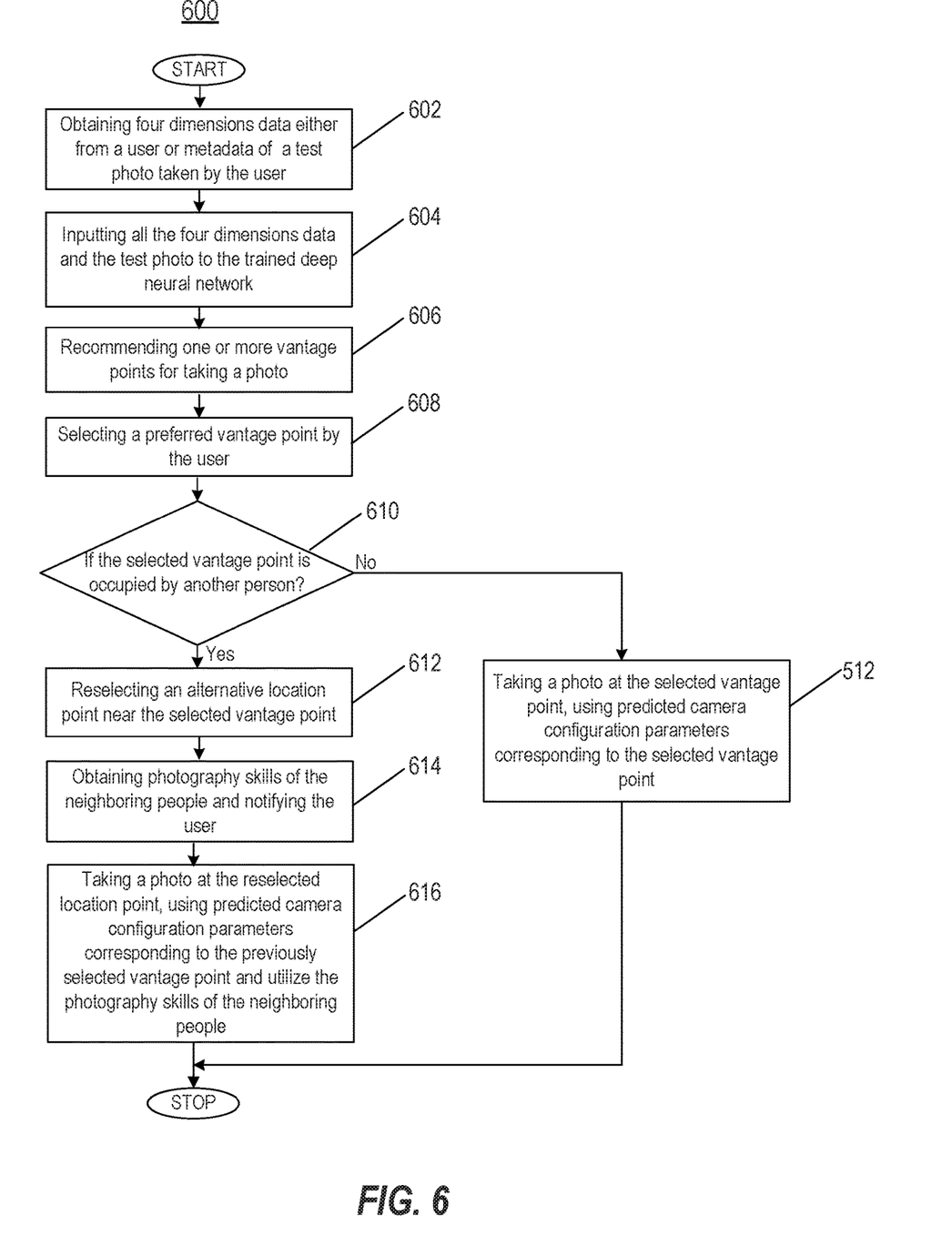
FIG. 6 depicts a flowchart of another exemplary method 600 for applying a trained machine learning model for recommending one or more vantage points and corresponding camera configuration parameters, according to embodiments described herein.

FIG. 6 depicts another exemplary flowchart 600 for applying a trained machine learning model for recommending one or more vantage points and corresponding camera configuration parameters, according to embodiments described herein. Steps 602 to 608 are the same as steps 502 to 508 in the method of FIG. 5.

At step 610, if the selected vantage point is occupied by another person (e.g., a tourist), then at step 612, the user can reselect an alternative location point near the selected vantage point, i.e., within a predetermined distance (e.g., one meter) from the selected vantage point; otherwise, if the selected vantage point is available, then step 512 is performed.

At step 614, photography skills of the neighboring people (e.g., tourists) within a predetermined distance (e.g., two meters) from the user can be obtained and shown on a screen of the mobile phone of the user. For example, if most of the neighboring people are taking a photograph having a horizontal orientation, then the user is also notified and recommended to take a photograph having a horizontal orientation. For another example, if most of the neighboring people are taking a selfie, then the user is also notified and recommended to take a selfie. In an embodiment, step 614 is optional and can be skipped.

At step 616, the user takes a photograph at the reselected location point, using a set of predicted camera configuration parameters corresponding to the previously selected vantage point. The reselected location point is near the previously selected vantage point, and thus the photograph, taken at the reselected location point using the recommended set of predicted camera configuration parameters, also has an acceptable quality. In an embedment, the user can choose to utilize the photography skills of the neighboring people when taking a photograph.

Figure 7:
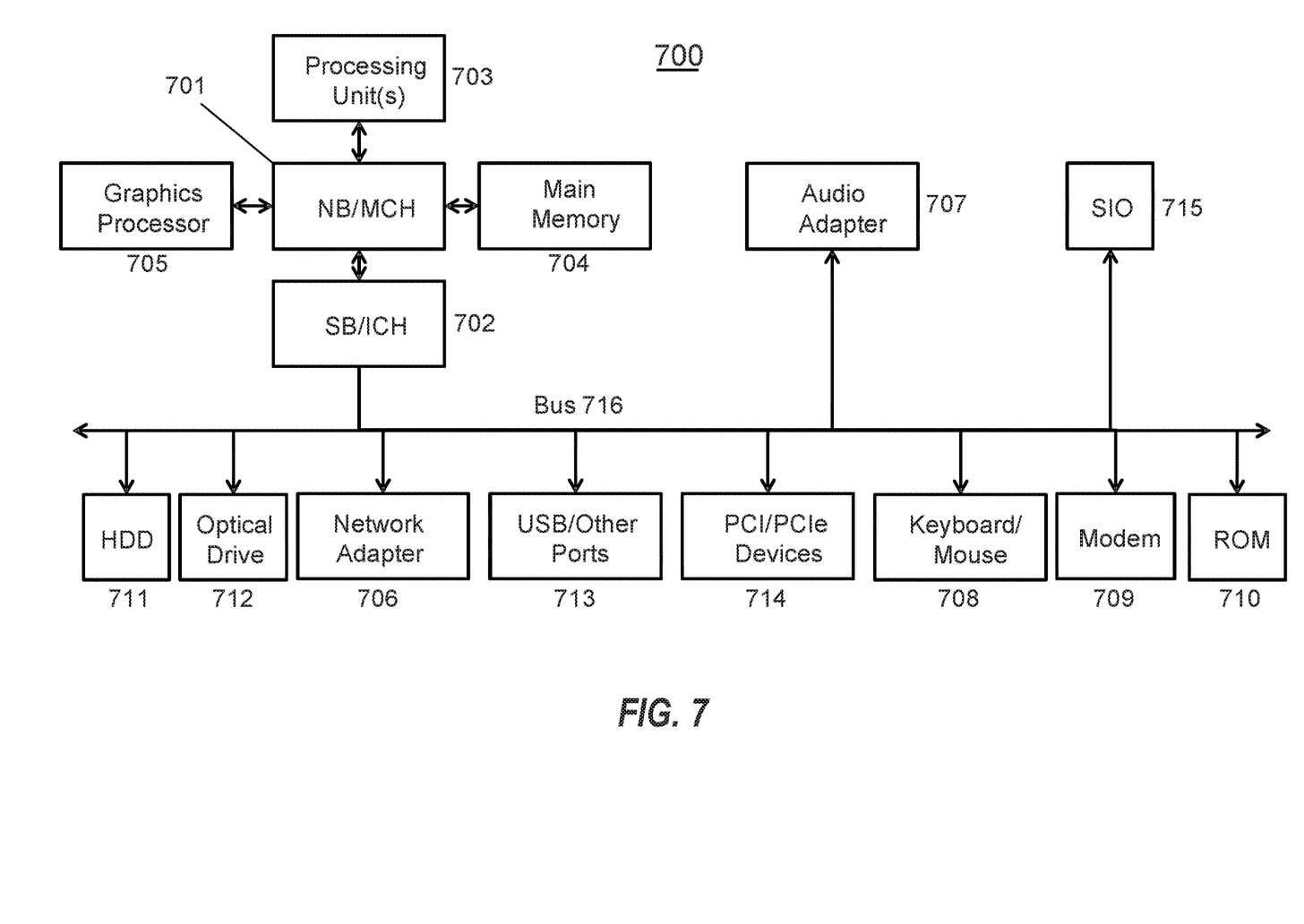
FIG. 7 depicts a block diagram of an example data processing system 700 in which aspects of the illustrative embodiments may be implemented.

FIG. 7 is a block diagram of an example data processing system 700 in which aspects of the illustrative embodiments are implemented. Data processing system 700 is an example of a computer in which computer usable code or instructions implementing the process for illustrative embodiments of the present invention are located. In one embodiment, at least some of the aspects of the camera configuration recommendation system 300 can be implemented on the data processing system 700. In another embodiment, data processing system 700 is an example of a mobile phone having a memory in which executable codes or instructions implementing the process for illustrative embodiments of the present invention are located. The mobile phone further includes a processor or microcontroller configured to execute the executable codes or instructions stored in the memory.

In the depicted example, the data processing system 700 can employ a hub architecture including a north bridge and memory controller hub (NB/MCH) 701 and south bridge and input/output (I/O) controller hub (SB/ICH) 702. Processing unit 703, main memory 704, and graphics processor 705 can be connected to the NB/MCH 701. Graphics processor 705 can be connected to the NB/MCH 701 through an accelerated graphics port (AGP).

In the depicted example, the network adapter 706 connects to the SB/ICH 702. The audio adapter 707, keyboard and mouse adapter 708, modem 709, read-only memory (ROM) 710, hard disk drive (HDD) 711, optical drive (CD or DVD) 712, universal serial bus (USB) ports and other communication ports 713, and the PCI/PCIe devices 714 can connect to the SB/ICH 702 through a bus system 716. PCI/PCIe devices 714 may include Ethernet adapters, add-in cards, and PC cards for notebook computers. ROM 710 may be, for example, a flash basic input/output system (BIOS). The HDD 711 and optical drive 712 can use an integrated drive electronics (IDE) or serial advanced technology attachment (SATA) interface. The super I/O (SIO) device 715 can be connected to the SB/ICH 702.

An operating system can run on processing unit 703. The operating system can coordinate and provide control of various components within the data processing system 700. As a client, the operating system can be a commercially available operating system. An object-oriented programming system, such as the Java™ programming system, may run in conjunction with the operating system and provide calls to the operating system from the object-oriented programs or applications executing on the data processing system 700. As a server, the data processing system 700 can be an IBM® eServer™ System p® running the Advanced Interactive Executive operating system or the LINUX® operating system. The data processing system 700 can be a symmetric multiprocessor (SMP) system that can include a plurality of processors in the processing unit 703. Alternatively, a single processor system may be employed.

Instructions for the operating system, the object-oriented programming system, and applications or programs are located on storage devices, such as the HDD 711, and are loaded into the main memory 704 for execution by the processing unit 703. The processes for embodiments of the web site navigation system can be performed by the processing unit 703 using computer usable program code, which can be located in a memory such as, for example, main memory 704, ROM 710, or in one or more peripheral devices.

A bus system 716 can be comprised of one or more busses. The bus system 716 can be implemented using any type of communication fabric or architecture that can provide for a transfer of data between different components or devices attached to the fabric or architecture. A communication unit such as the modem 709 or network adapter 706 can include one or more devices that can be used to transmit and receive data.

Those of ordinary skill in the art will appreciate that the hardware depicted in FIG. 7 may vary depending on the implementation. For example, the data processing system 700 includes several components that would not be directly included in some embodiments of the camera configuration recommendation system 300. However, it should be understood that the camera configuration recommendation system 300 may include one or more of the components and configurations of the data processing system 700 for performing processing methods and steps in accordance with the disclosed embodiments.

Moreover, other internal hardware or peripheral devices, such as flash memory, equivalent non-volatile memory, or optical disk drives, may be used in addition to or in place of the hardware depicted. Moreover, the data processing system 700 can take the form of any of a number of different data processing systems, including but not limited to, client computing devices, server computing devices, tablet computers, laptop computers, telephone or other communication devices, personal digital assistants, and the like. Essentially, the data processing system 700 can be any known or later developed data processing system without architectural limitation.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present disclosure.

The present disclosure may be a system, a method, and/or a computer program product. The computer program product may include a computer-readable storage medium (or media) having computer readable program instructions thereon for causing a processor to carry out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine-dependent instructions, microcode, firmware instructions, state-setting data, or either source code or object code written in any combination of one or more programming languages, including an object-oriented programming language such as Java™ Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or another device to cause a series of operations steps to be performed on the computer, other programmable apparatus, or another device to produce a computer-implemented process, such that the instructions which execute on the computer, other programmable apparatus, or other device implement the functions/acts specified in the flowchart and/or block diagram block or blocks.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

Those of ordinary skill in the art will appreciate that the hardware required to run any of the systems and methods described herein may vary depending on the implementation. Other internal hardware or peripheral devices, such as flash memory, equivalent non-volatile memory, or optical disk drives, may be used in addition to or in place of the hardware depicted. Moreover, any of the systems described herein can take the form of any of a number of different data processing systems, including but not limited to, client computing devices, server computing devices, tablet computers, laptop computers, telephone or other communication devices, personal digital assistants, and the like. Essentially, any of the systems described herein can be any known or later developed data processing system without architectural limitation.

The systems and methods of the figures are not exclusive. Other systems and processes may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 USC. 112 (f), unless the element is expressly recited using the phrase "means for."

Although the present invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A computer-implemented method of recommending camera configuration parameters for taking one or more photographs by a user in a data processing system comprising a processor and a memory comprising instructions which are executed by the processor, the method comprising:

acquiring, by the processor, first spatial dimension data, first temporal dimension data, and first manufacturer dimension data of a particular camera for taking the one or more photographs;

inputting, by the processor, the first spatial dimension data, the first temporal dimension data, and the first manufacturer dimension data to a trained machine learning model;

converting, by the processor, the first spatial dimension data to a spatial embedding matrix;

converting, by the processor, the first temporal dimension data to a temporal embedding matrix;

converting, by the processor, the first manufacturer dimension data to a manufacturer embedding matrix; and building, by the processor, a joint embedding matrix based on the spatial embedding matrix, the temporal embedding matrix, and the manufacturer embedding matrix;

recommending, by the trained machine learning model, one or more vantage points for taking the one or more photographs, each vantage point corresponding to a different set of predicted camera configuration parameters, wherein the one or more vantage points are recommended, by the processor, based on the joint embedding matrix;

receiving, by the processor, a selection of one of the one or more vantage points from the user; and providing, by the processor, a set of predicted camera configuration parameters corresponding to the selected vantage point.

2. The method of claim 1, further comprising:

instructing, by the processer, the user to reach the selected vantage point; and instructing, by the processor, the user to take the one or more photographs at the selected vantage point using the set of predicted camera configuration parameters.

3. The method of claim 2, wherein the user is instructed to reach the selected vantage point under Augmented Reality guidance.

4. The method of claim 1, further comprising:

receiving, by the processor, a test photograph from the user, wherein the test photograph is taken by the particular camera;

extracting, by the processor, the first spatial dimension data, the first temporal dimension data, and the first manufacturer dimension data from metadata of the test photograph; and inputting, by the processor, the test photograph to the trained machine learning model.

5. The method of claim 4, further comprising:

extracting, by the processor, first user constraint dimension data from the metadata of the test photograph; and inputting, by the processor, the first user constraint dimension data to the trained machine learning model.

6. The method of claim 1, further comprising:

when the selected vantage point is unavailable, instructing, by the processor, the user to reselect an alternative location point within a first predetermined distance from the selected vantage point;

instructing, by the processor, the user to reach the alternative location point; and instructing, by the processor, the user to take the one or more photographs at the alternative location point using the set of predicted camera configuration parameters corresponding to the selected vantage point.

7. The method of claim 6, further comprising:
obtaining one or more photography skills of neighboring people within a second predetermined distance from the user, wherein the one or more photographs are taken using the one or more photography skills of the neighboring people.

8. A computer-implemented method of recommending camera configuration parameters for taking one or more photographs by a user in a data processing system comprising a processor and a memory comprising instructions which are executed by the processor, the method comprising:
acquiring, by the processor, first spatial dimension data, first temporal dimension data, and first manufacturer dimension data of a particular camera for taking the one or more photographs;
inputting, by the processor, the first spatial dimension data, the first temporal dimension data, and the first manufacturer dimension data to a trained machine learning model, wherein the trained machine learning model is trained by a method comprising:
crowdsourcing, by the processor, a plurality of photographs from an internet,
extracting, by the processor, second spatial dimension data, second temporal dimension data, second manufacturer dimension data, and a second set of camera configuration parameters from metadata of each crowdsourced photograph,
inputting, by the processor, the second spatial dimension data, the second temporal dimension data, the second manufacturer dimension data, and the plurality of photographs to a machine learning model to be trained, and
training, by the processor, the machine learning model to predict a different set of camera configuration parameters for each crowdsourced photograph, so that Mean Squared Error (MSE) loss between the predicted set of camera configuration parameters and the second set of camera configuration parameters is minimized;
recommending, by the trained machine learning model, one or more vantage points for taking the one or more photographs, each vantage point corresponding to a different set of predicted camera configuration parameters;
receiving, by the processor, a selection of one of the one or more vantage points from the user; and
providing, by the processor, a set of predicted camera configuration parameters corresponding to the selected vantage point.

9. The method of claim 4, wherein the first spatial dimension data includes location coordinates of the particular camera, an angle of view of the particular camera, and a camera orientation of the particular camera; the first temporal dimension data includes weather condition, time information, and lighting condition; the first manufacturer dimension data includes focal length, resolution, filter type, lens details, depth camera, and autofocus.

10. A computer program product of recommending camera configuration parameters for taking one or more photographs by a user, the computer program product comprising a non-transitory computer-readable storage medium having program instructions embodied therewith, the program instructions executable by a processor to cause the processor to:
acquire first spatial dimension data, first temporal dimension data, and first manufacturer dimension data of a particular camera for taking the one or more photographs;
input the first spatial dimension data, the first temporal dimension data, and the first manufacturer dimension data to a trained machine learning model;
convert the first spatial dimension data to a spatial embedding matrix;
convert the first temporal dimension data to a temporal embedding matrix;
convert the first manufacturer dimension data to a manufacturer embedding matrix;
build a joint embedding matrix based on the spatial embedding matrix, the temporal embedding matrix, and the manufacturer embedding matrix;
recommend, by the trained machine learning model, one or more vantage points for taking the one or more photographs, each vantage point corresponding to a different set of predicted camera configuration parameters, wherein the one or more vantage points are recommended based on the joint embedding matrix;
receive a selection of one of the one or more vantage points from the user; and
provide a set of predicted camera configuration parameters corresponding to the selected vantage point.

11. The computer program product as recited in claim 10, wherein the processor is further caused to:
instruct the user to reach the selected vantage point; and
instruct the user to take the one or more photographs at the selected vantage point using the set of predicted camera configuration parameters.

12. The computer program product as recited in claim 10, wherein the processor is further caused to:
receive a test photograph from the user, wherein the test photograph is taken by the particular camera;
extract the first spatial dimension data, the first temporal dimension data, and the first manufacturer dimension data from metadata of the test photograph; and
input the test photograph to the trained machine learning model.

13. The computer program product as recited in claim 10, wherein the processor is further caused to:
when the selected vantage point is unavailable,
instruct the user to reselect an alternative location point within a first predetermined distance from the selected vantage point;
instruct the user to reach the alternative location point; and
instruct the user to take the one or more photographs at the alternative location point using the set of predicted camera configuration parameters corresponding to the selected vantage point.

14. A system of recommending camera configuration parameters for taking one or more photographs by a user, comprising:
a processor configured to:
acquire first spatial dimension data, first temporal dimension data, and first manufacturer dimension data of a particular camera for taking the one or more photographs;
input the first spatial dimension data, the first temporal dimension data, and the first manufacturer dimension data to a trained machine learning model;
convert the first spatial dimension data to a spatial embedding matrix;

convert the first temporal dimension data to a temporal embedding matrix;
convert the first manufacturer dimension data to a manufacturer embedding matrix;
build a joint embedding matrix based on the spatial embedding matrix, the temporal embedding matrix, and the manufacturer embedding matrix;
recommend, by the trained machine learning model, one or more vantage points for taking the one or more photographs, each vantage point corresponding to a different set of predicted camera configuration parameters, wherein the one or more vantage points are recommended based on the joint embedding matrix;
receive a selection of one of the one or more vantage points from the user; and
provide a set of predicted camera configuration parameters corresponding to the selected vantage point.

15. The system as recited in claim 14, wherein the processor is further configured to:
instruct the user to reach the selected vantage point; and
instruct the user to take the one or more photographs at the selected vantage point using the set of predicted camera configuration parameters.

16. The system as recited in claim 14, wherein the processor is further configured to:
receive a test photograph from the user, wherein the test photograph is taken by the particular camera;
extract the first spatial dimension data, the first temporal dimension data, and the first manufacturer dimension data from metadata of the test photograph; and
input the test photograph to the trained machine learning model.

17. The system as recited in claim 14, wherein the processor is further configured to:
when the selected vantage point is unavailable,
instruct the user to reselect an alternative location point within a first predetermined distance from the selected vantage point;
instruct the user to reach the alternative location point; and
instruct the user to take the one or more photographs at the alternative location point using the set of predicted camera configuration parameters corresponding to the selected vantage point.

* * * * *